United States Patent [19]
Fukuda

[11] Patent Number: 4,499,961
[45] Date of Patent: Feb. 19, 1985

[54] COMBINATORIAL WEIGHING APPARATUS WITH CHECK WEIGHER

[75] Inventor: Masao Fukuda, Shiga, Japan

[73] Assignee: Kabushiki Kaisha Ishida Koki Seisakusho, Kyoto, Japan

[21] Appl. No.: 506,319

[22] Filed: Jun. 21, 1983

[30] Foreign Application Priority Data

Jun. 22, 1982 [JP] Japan .............................. 57-93319[U]

[51] Int. Cl.³ ..................... G01G 19/22; G01G 19/52; B07C 5/16
[52] U.S. Cl. ........................................ 177/25; 177/50; 209/592
[58] Field of Search .................................. 177/25, 50; 209/592-596

[56] References Cited

U.S. PATENT DOCUMENTS

| | | | |
|---|---|---|---|
| 3,620,316 | 11/1971 | Henry et al. ........................... | 177/50 |
| 4,418,771 | 12/1983 | Henry et al. ........................ | 177/25 X |
| 4,465,149 | 8/1984 | Kawashima et al. .................. | 177/25 |
| 4,467,881 | 8/1984 | Kitagawa ............................... | 177/50 |

Primary Examiner—George H. Miller, Jr.
Attorney, Agent, or Firm—Staas & Halsey

[57] ABSTRACT

A combinatorial weighing apparatus combines weight data from a plurality of weighing machines, finds a combination of weights giving a weight sum equal or closest to a target weight value within an allowable weight range setting, and discharges articles from the weighing machines providing the combination of weights. The combinatorial weighing apparatus includes a reweighing device for reweighing the discharged articles. The reweighing device is composed of a checking hopper for retaining the discharged articles and a checking weighing machine attached to the checking hopper for reweighing the articles in the checking hopper. The combinatorial weighing apparatus further includes a display unit for displaying the reweighed result and a selection unit for accepting or rejecting the articles based on the reweighed data to prevent those articles giving a total weight outside the allowable weight range setting from being delivered to a packing machine.

8 Claims, 3 Drawing Figures

COMBINATORIAL WEIGHING APPARATUS WITH CHECK WEIGHER

BACKGROUND OF THE INVENTION

The present invention relates to a combinatorial weighing apparatus, and more particularly to a combinatorial weighing apparatus having a reweighing capability for reweighing discharged articles that have been weighed.

Combinatorial weighing apparatus have a plurality of weighing hoppers supplied with batches of articles to be weighed, a plurality of weight detectors for measuring weights of the batches of articles supplied respectively to the weighing hoppers, and a combinatorial computing unit. The weighing hoppers and the weight detectors jointly form weighing machines. The combinatorial computing unit serves to effect a combinatorial arithmetic operation for finding a combination of batch weights (hereinafter referred to as an "optimum combination") equal or closest to a target weight value within an allowable weight range setting. The combinatorial computing unit also controls those weighing machines, which provide an optimum combination, to discharge the weighed articles onto a packing line. The combinatorial computing unit then supplies new batches of articles into the weighing machines from which the articles have been discharged, and repeats the foregoing cycle of combinatorial weighing for a continued automatic weighing process.

The weight sum, indicative of the optimum weight combination as computed by the combinatorial computing unit, is displayed on a display unit.

There are many instances where weighing machines of the foregoing construction are placed in locations subjected to various externally induced disturbances due to vibrations and winds. Where a vibratory supply unit is employed for supplying articles to be weighed into the weighing machines, the weighing machines are directly subjected to vibrations caused by the vibratory unit. Therefore, the weighing machines produce weight detector outputs or weight values containing measurement errors. This sometimes causes the sum of the weights of actually discharged articles to fall outside an allowable weight range setting, that is, smaller than a target weight or greater than an upper weight limit. When such a condition arises, the weighing apparatus is automatically inactivated, and the user has to manually discharge the articles out of the weighing apparatus and start the apparatus again. If it is not desired to shut down the production line for reconditioning the weighing apparatus, then the weighing apparatus must be continuously operated to allow batches of articles having an improper total weight to be discharged, and the packed articles have to be checked for inaccurately weighed products, which are then rejected. Furthermore, articles tend to get stuck to the weighing hoppers, and the total weight of actually discharged articles is liable to differ from the displayed weight.

It has been a conventional practice to incorporate a checker or checking weighing device in a packaging line for checking the weight of articles discharged from the combinatorial weighing apparatus. However, such a checker has been highly expensive and requires a large space for its installation. There is a demand for incorporation of the checker into the weighing machines so as to render the combinatorial weighing apparatus more reliable in operation and meet the requirement of total controllability.

SUMMARY OF THE INVENTION

It is an object of the present invention to provide a combinatorial weighing apparatus with a checking weighing machine, which is less costly and does not require a large installation space.

Another object of the present invention is to provide a combinatorial weighing apparatus, which has a highly reliable operation, with a reweighing means which is free from influences due to vibrations of a unit for supplying articles and supply troughs.

Still another object of the present invention is to provide a combinatorial weighing apparatus capable of displaying the result of a reweighing operation and of checking if the discharged articles are of a proper or an improper weight based on the result of the reweighing operation. The reweighing operation prevents those article combinations of weights outside of an allowable weight range setting from being delivered to a packing machine.

According to the present invention, a combinatorial weighing apparatus combines weight data from a plurality of weighing machines, finds a combination of weights giving a weight sum equal or closest to a target weight value within an allowable weight range setting, and discharges articles from the weighing machines providing the combination of weights. The combinatorial weighing apparatus includes a reweighing device for reweighing the discharged articles. The reweighing device is composed of a checking hopper for containing the discharged articles and a checking weighing machine attached to the checking hopper for reweighing the articles in the checking hopper under a condition free from vibrations of an article supply unit and supply troughs. The combinatorial weighing apparatus further includes a display unit for displaying the reweighed result and a selection unit for checking the articles as accepted or rejected based on the reweighed data to prevent those articles giving a total weight outside the allowable weight range setting from being delivered to a packing machine.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
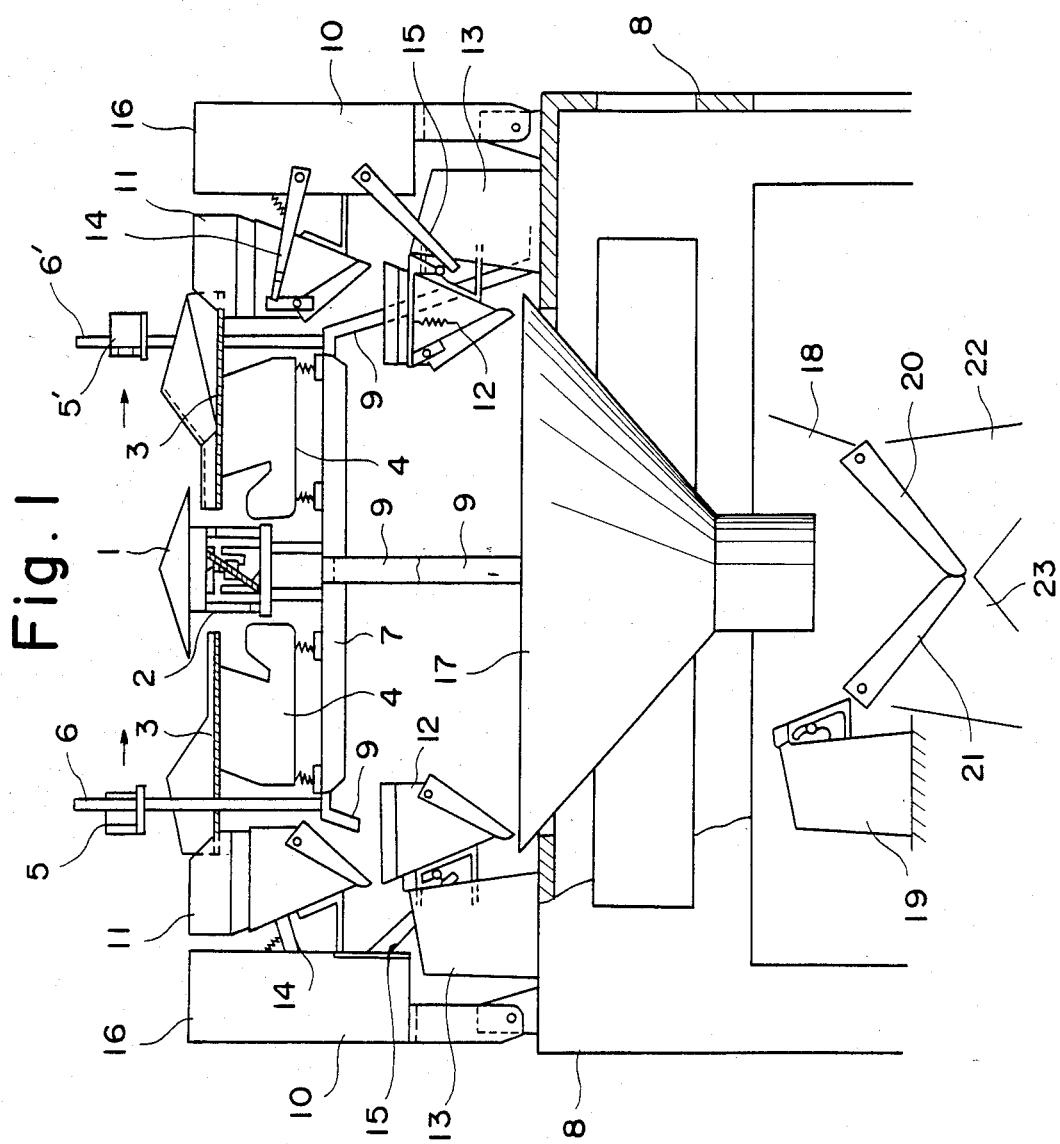
FIG. 1 is a side elevational view, partly in cross section, of the mechanism of a combinatorial weighing apparatus according to the present invention.
Figure 2:
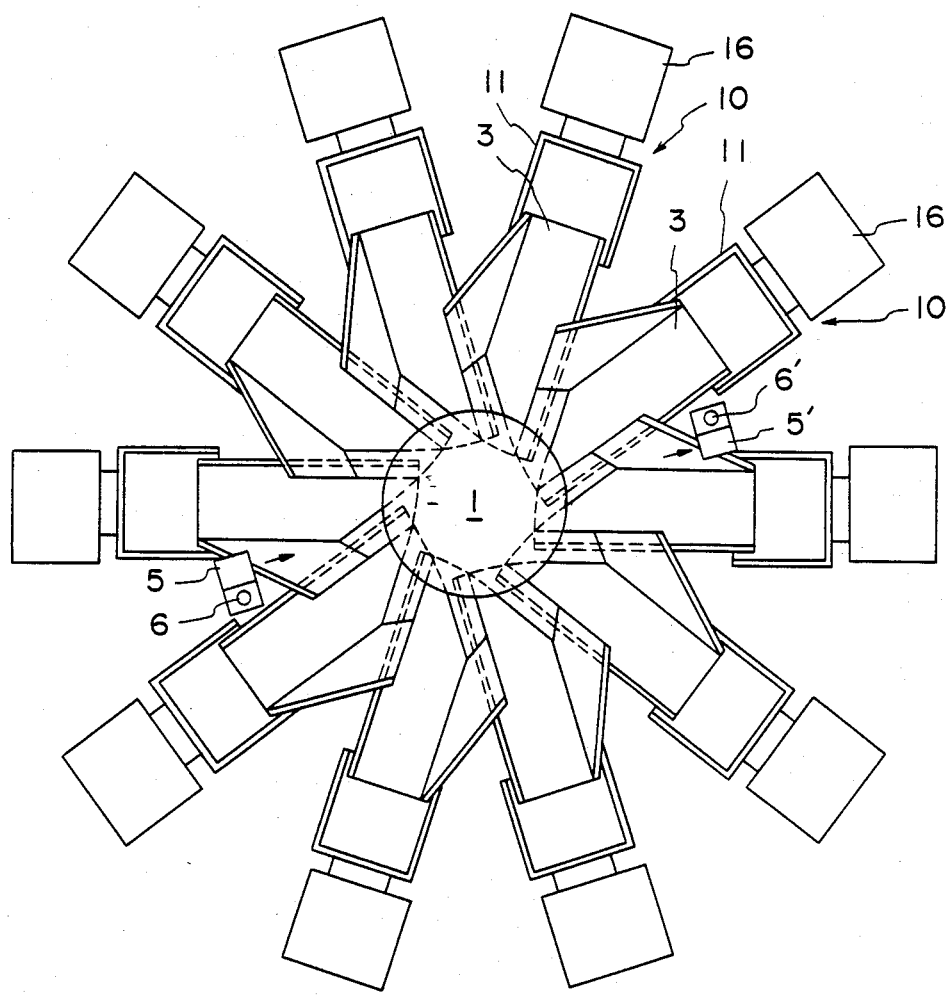
FIG. 2 is a plan view of the mechanism of the combinatorial weighing apparatus shown in FIG. 1.

FIGS. 1 and 2 schematically illustrate the mechanism of a combinatorial weighing apparatus according to the present invention. The mechanism comprises a conical dispersion or distribution table 1 supported on an electromagnetic vibratory unit 2 for producing helical reciprocating vibratory motion. The dispersion table 1 may be driven to rotate in one direction only, by means of a motor. The dispersion table 1 is surrounded by a plurality of supply troughs 3 disposed radially outward of the dispersion table 1 and having rear end portions located below the dispersion table 1 out of contact therewith. The supply troughs 3 are mounted on respective electromagnetic vibratory units 4 so as to be vibratable thereby. A light-emitting unit 5 and a photodetector unit 5' are positioned in diametrically opposite relation across the dispersion table 1 for detecting how many articles remain on the dispersion table 1 and for controlling the supply of articles from a supply unit (not shown) onto the dispersion table 1. The light-emitting unit 5 and the photodetector 5' are mounted on posts 6 and 6', respectively, so as to be positionally adjustable in the vertical direction. A circular support base 7 is supported by a plurality of legs 9 mounted on a frame 8 and placed over the frame 8, the electromagnetic vibratory units 2 and 4 being placed on the support base 7.

A plurality of weighing mechanisms 10 are mounted on the frame 8 in radially outward relation to the supply troughs 3, the weighing mechanism 10 being positioned downward of distal ends of the supply troughs 3. Each of the weighing mechanisms 10 comprises a pool hopper 11 located below the distal end of one of the supply troughs 3, a weighing hopper 12 positioned downward of the pool hopper 11, a weight detector 13 for weighing a batch of articles contained in a weighing hopper 12, and a driver 16 supporting the pool hopper 11 and having lever mechanisms 14 and 15 for opening and closing the hoppers 11 and 12. A chute 17 is mounted centrally in the frame 8 and has an upper edge projecting slightly beyond an upper surface of the frame 8 for collecting articles discharged from the weighing hoppers 12 of the respective weighing machine. A checking hopper 18 is located below the chute 17 for containing the articles collected by and discharged from the chute 17. The checking hopper 18 is associated with a checking weighing machine 19 which measures the weight of articles accommodated in the checking hopper 18. A pair of acceptance and rejection gates 20 and 21 is disposed below the checking hopper 18, and a pair of acceptance and rejection chutes 22 and 23 is located downward of the acceptance and rejection gates 20 and 21, respectively. If the weight of articles, as measured by the checking weighing machine 19, is within an allowable weight range setting, then the acceptance gate 20 is opened to allow the articles to be discharged through the acceptance chute 22 onto a bucket conveyor or packing machine (not shown). If the measured weight does not fall within the allowable weight range, then the rejection gate 21 is opened to discharge the articles through the rejection chute 23 into a collector. A mechanism for opening and closing the gates 20 and 21 and a driver for driving them are not shown in FIGS. 1 and 2.

The weighing apparatus of the foregoing construction will operate as follows: Articles are supplied from a supply unit (not shown), positioned above the dispersion table 1, onto the dispersion table. The detector, composed of the light-emitting unit 5 and the photodetector 5', detects when the number of articles on the dispersion table 1 is below a certain level, and drives the supply unit to charge articles onto the dispersion table 1. Therefore, a number of articles beyond such a certain level remain on the dispersion table 1 at all times. The articles on the dispersion table 1 are driven to move progressively along helical paths radially outward on the conical surface of the dispersion table 1 which vibrates helically and reciprocally under centrifugal forces due to twisting reciprocal vibrations imparted by the electromagnetic vibratory unit 2. The articles are then supplied as batches into the supply troughs 3 and accumulated therein. The articles move progressively forward in the supply troughs 3 which reciprocally vibrate along inclined straight lines due to rectilinear reciprocal vibrations of the electromagnetic vibratory units 4, and then are charged from the distal ends of the supply troughs 3 into the pool hoppers 11. The supply troughs 3 start vibrating in response to a signal from the weighing machines when the pool hoppers 11 have discharged articles and become empty. The supply troughs 3 continue to vibrate for a fixed interval of time set by timers associated respectively with the supply troughs 3. The periods of time during which the supply troughs 3 vibrate may vary from supply trough to supply trough, or may be the same.

The articles charged into the pool hoppers 11 are then charged into the weighing hoppers 12 where they are weighed by the weight detectors 13. The weights of the batches of articles, as measured by the weighing machines, are then subjected to a combinatorial arithmetic operation is a combinatorial computing unit which selects a weight combination equal or closest to a target weight value within an allowable weight range setting. The combinatorial computing unit then controls the drivers 16 and the lever mechanisms 15, to open those weighing hoppers 12 which give such a weight combination, for discharging the articles into the chute 17 which then supplies the articles to the checking hopper 18. When the checking hopper 18 stops vibrating, the checking weighing machine 19 measures the weight of the articles contained in the checking hopper 18. The weight as measured by the checking weighing machine 19 is fed to a comparator (described later on) which determines whether the weight falls within the allowable weight range setting. If it falls in the range setting, then the acceptance gate 20 is opened to allow the articles to be discharged through the acceptance chute 22 onto the bucket conveyor or packing machine. If the weight does not fall in the range setting, then the rejection gate 21 is opened to discharge the articles through the rejection chute 23.

The empty weighing hoppers 12 from which the articles have been discharged are supplied again with batches of articles from the corresponding pool hoppers 11 opened by the associated drivers 16 and lever mechanisms 14. In response to a signal from the weighting machines, the supply troughs 3 vibrate again for fixed intervals of time, set by the timers, to supply batches of articles into the empty pool hoppers 11. At the same time that the articles are charged from the supply troughs 3 into the pool hoppers 11, the batches of articles in the weighing hoppers 12 are weighed and the measured weights are computed to select a weight combination equal or closest to the target value within the allowable weight range setting. The foregoing process is then repeated.

The articles contained in the weighing hoppers 12 which have not been selected are not discharged, and their weights will be used again in a next combinatorial arithmetic operation. The pool hoppers 11 corresponding to the unselected weighing hoppers 12 remain closed, and the associated supply troughs 3 also remain unactivated.

In the weighing apparatus illustrated in FIGS. 1 and 2, the total weight of the articles discharged from the weighing hoppers giving the optimum weight combination is reweighed under a stationary condition in the checking hopper 18 by the checking weighing machine 19, the weighing operation being free from vibrations. Based on the result of the reweighing operation, the articles are determined as being either accepted or rejected and are discharged accordingly. In addition to discharging the articles as accepted or rejected, the reweighed result may be displayed.

Figure 3:
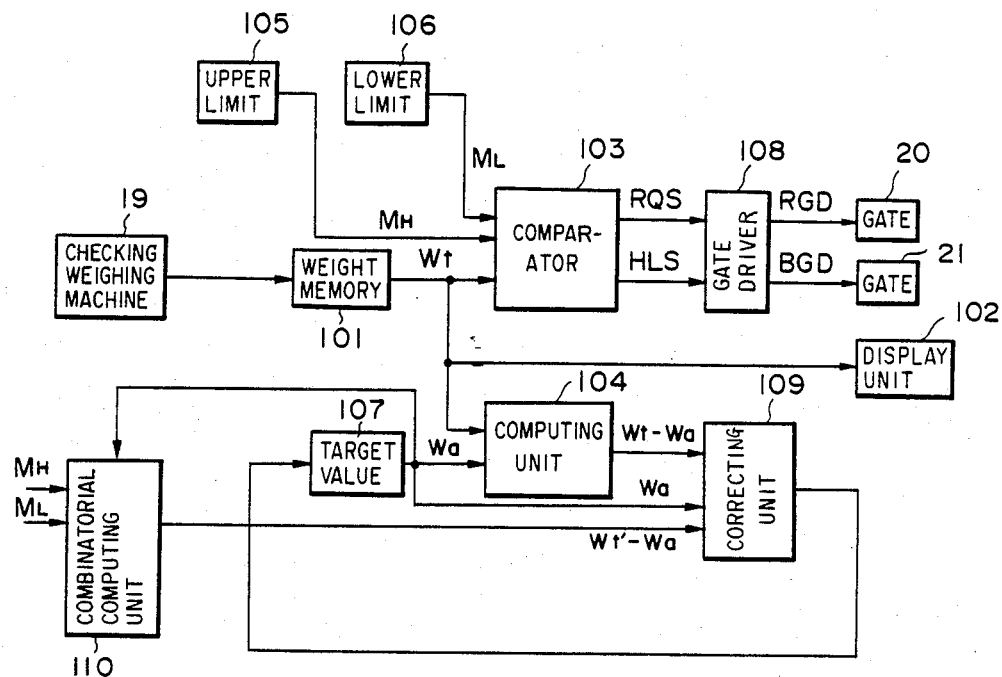
FIG. 3 is a block diagram of a control circuit of the combinatorial weighing apparatus of the invention.

FIG. 3 is a block diagram of a circuit of the weighing apparatus of the present invention.

A weight memory 101 stores, at a prescribed timing, a weight Wt as measured by the checking weighing machine 19, and the weight Wt is supplied to a display unit 102, a comparator 103, and a computing unit 104. The display unit 102 displays the weight Wt. The comparator 103 compares the weight Wt with an upper limit $M_H$ of the allowable weight range setting and a lower limit $M_L$ thereof, and issues an acceptance signal RQS when $$M_L \leq Wt \leq M_H \quad (1)$$

and issues a rejection signal HLS when $$Wt < M_L \text{ or } M_H < Wt \quad (2)$$

The upper and lower limits $M_H$ and $M_L$ are set respectively in upper and lower setting units 105 and 106. The computing unit 104 computes the difference (Wt−Wa) between the weight Wt and a target weight value Wa stored in a target value setting unit 107. A gate driver 108 issues an acceptance gate drive RGD to open the acceptance gate 20 in response to application of the acceptance signal RQS, or issues a rejection gate drive signal BGD to open the rejection gate 21 in response to application of the rejection signal HLS. A correcting unit 109 has a first input terminal supplied with the difference (Wt′−Wa) between a sum weight Wt′ of an optimum combination supplied from a combinatorial computing unit 110 and the target value Wa, and a second input terminal fed with the difference (Wt−Wa) from the computing unit 104. The correcting unit 109 effects an arithmetic operation expressed by:

$$Wc = k\{(Wt' - Wa) - (Wt - Wa)\} = k\{Wt' - Wt\} \quad (3)$$

(k is a constant less than or equal to one) to find a corrected value Wc, and then carries out the following arithmetic operation:

$$Wa + Wc \rightarrow Wa \quad (4)$$

The result is used to renew the target value Wa stored in the target value setting unit 107. For example, it is assumed that the target value Wa is 100 (g), the sum weight Wt′ obtained by the combinatorial computing unit 110 is 105 (g), and the weight Wt measured by the checking weighing machine 19 is 99 (g). The sum weight Wt′ is subjected to an error +6 (g) as compared with the actual weight Wt due, for example, to vibrations of the weighing machines. By setting the target value higher than 100 (g), that is, by selecting the target value Wa to be 103 (g) through the arithmetic operations of (3) and (4) with k=½, the actual weight Wt falls within the allowable weight range setting at all times.

Operation of the circuit arrangement of FIG. 3 will be described.

When the combinatorial computing unit 110 finds an optimum combination through a combinatorial arithmetic operation, the articles are discharged from the weighing machines (weighing hoppers) providing the optimum combination to the checking hopper 18 (FIG. 1). When the articles are charged into the checking hopper 18, the weight Wt issued from the checking weighing machine 19 is stored in the weight memory 101 at the time the checking hopper 18 stops vibrating. The comparator 103 effects a comparison operation to determine whether the weight Wt meets the formula (1) using the weight Wt, the target value Wa, the upper limit $M_H$, and the lower limit $M_L$. If the expression (1) is met, then the comparator 103 issues the acceptance signal RQS. If the expression (2) is met, then the comparator 103 issues the rejection signal LHS. In response to the acceptance signal or the rejection signal, the gate driver 108 opens the acceptance gate 20 or the rejection gate 21 to discharge the accepted or rejected articles.

Simultaneously with the foregoing operation, the output (Wt−Wa) from the computing unit 104 and the output (Wt′−Wa) from the combinatorial computing unit 110 are supplied to the correcting unit 109, which then effects a corrective action. More specifically, the correcting unit 109 computes the corrected value Wc according to the equation (3), and then finds a new target value Wa according to the expression (4) to renew the content of the target setting unit 107.

The above process is a complicated control procedure for obtaining a highly accurate weighed value, including a corrective process for automatically renewing and storing the target value Wa, in order to compare the target value Wa and the actual weight Wa+Wc and; bring them as close as possible to each other.

In general, however, the weight Wt from the checking weighing machine 19 is compared with the upper and lower limits $M_H$ and $M_L$ of the allowable weight range setting according to the equations (1) and (2), and based on the result of the comparison, the acceptance signal RQS or the rejection signal HLS is issued to enable the gate driver 108 to open the acceptance gate 20 or the rejection gate 21 to discharge the accepted or rejected articles. The foregoing operation performs a checking function only, and is enough for an actual weighing operation. The weight data from the checking weighing machine 19 (as stored in the weight memory 101) can be recorded by connecting totalling machines, or occurrences of article rejection can be counted to provide production information. Such data can also be utilized as command signals for generating various alarms or automatically controlling the weighing apparatus, and thus can be effectively employed for added functions of the weighing apparatus.

The checking hopper 18 can pool a number of articles weighed in one weighing operation, and serves as a timing hopper for discharging the articles momentarily onto the bucket conveyor or the packing machine while preventing the articles from leaking or escaping when transferred from the checking hopper to the bucket conveyor.

With the arrangement of the present invention, the checking hopper and the checking weighing machine, which are free from the influence of vibrations of the supply unit and the supply troughs, are used to reweigh the articles, and the weight as measured by the checking weighing machine is displayed. Therefore, the articles can be weighed and displayed accurately. Since the articles are checked for weight acceptance or rejection based on the result of the reweighing operation, there is no tendency of those articles giving a total weight falling outside the allowable weight range setting to be discharged to the packing machine. The checking hopper and the checking weighing machine can be located below the existing weighing apparatus, and therefore do not involve an increase in the cost and installation space.

Although a certain preferred embodiment has been shown and described, it should be understood that many changes and modifications may be made therein without departing from the scope of the appended claims.

What is claimed is:

1. A combinatorial weighing apparatus for combining batches of articles having weight data from a plurality of weighing machines, finding a combination of weights giving a weight sum equal or closest to a target weight value within an allowable weight range setting, and discharging the batches of articles from the weighing machines providing the combination of weights, said combinatorial weighing apparatus comprising:
    (a) a checking hopper for retaining the batches of articles discharged from the weighing machines providing the combination of weights; and
    (b) a checking weighing machine, operatively connected to said checking hopper, for reweighing the batches of articles contained therein and providing reweighing data.

2. A combinatorial weighing apparatus according to claim 1, including selection means, operatively connected to said checking weighing machine, for accepting or rejecting the batches of articles contained in said checking hopper in dependence upon the reweighing data from said checking weighing machine.

3. A combinatorial weighing apparatus according to claim 1, including correction means for correcting the target weight value based on the reweighing data from said checking weighing machine.

4. A combinatorial weighing apparatus according to claim 1, including display means for displaying the reweighing data from said checking weighing machine.

5. A combinatorial weighing apparatus according to claim 1, wherein said checking hopper and said checking weighing machine are disposed below the weighing machines.

6. A combinatorial weighing apparatus for combining batches of articles, comprising:
    means for performing a combinatorial weighing operation to determine selected ones of the batches of articles, said means for performing a combinatorial weighing operation including means for discharging the selected ones of the batches of articles along a discharge path;
    a checking hopper, positioned in said discharge path of said means for performing a combinatorial weighing operation, for receiving and retaining the selected ones of the batches of articles; and
    a checking weighing machine, coupled to said checking hopper, for reweighing the selected ones of the batches of articles received by said checking hopper.

7. A combinatorial weighing apparatus according to claim 6, further comprising selection means, extending from said checking hopper, for accepting or rejecting the reweighed selected ones of the batches of articles.

8. A combinatorial weighing apparatus according to claim 7, wherein said selection means further comprises an acceptance chute for accepting the reweighed selected ones of the batches of articles and a rejection chute for rejecting the reweighed selected ones of the batches of articles.

* * * * *

UNITED STATES PATENT AND TRADEMARK OFFICE
CERTIFICATE OF CORRECTION

PATENT NO. : 4,499,961
DATED : FEBRUARY 19, 1985
INVENTOR(S) : MASAO FUKUDA

It is certified that error appears in the above-identified patent and that said Letters Patent is hereby corrected as shown below:

Col. 3, line 54, "them" should be --the gates--.

Col. 4, line 49, "weighting" should be --weighing--.

Col. 6, line 34, "and;" should be --and to--;

line 52, "thus" should be --thus,--.

Signed and Sealed this

Eighteenth Day of June 1985

[SEAL]

Attest:

DONALD J. QUIGG

Attesting Officer     Acting Commissioner of Patents and Trademarks